(12) United States Patent
Quakernack et al.

(10) Patent No.: US 11,456,973 B2
(45) Date of Patent: Sep. 27, 2022

(54) CIRCUIT FOR A BUFFERED TRANSMISSION OF DATA

(71) Applicant: WAGO Verwaltungsgesellschaft mbH, Minden (DE)

(72) Inventors: Frank Quakernack, Bielefeld (DE); Frank Schadde, Luebbecke (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 17/152,209

(22) Filed: Jan. 19, 2021

(65) Prior Publication Data

US 2021/0144105 A1 May 13, 2021

Related U.S. Application Data

(63) Continuation of application No. PCT/IB2019/055707, filed on Jul. 4, 2019.

(30) Foreign Application Priority Data

Jul. 17, 2018 (DE) .................... 10 2018 005 620.2

(51) Int. Cl.
*H04L 12/879* (2013.01)
*H04L 12/861* (2013.01)
(Continued)

(52) U.S. Cl.
CPC ........ *H04L 49/901* (2013.01); *H04L 49/9047* (2013.01)

(58) Field of Classification Search
CPC ............................ H04L 49/901; H04L 49/9047
(Continued)

(56) References Cited

U.S. PATENT DOCUMENTS 4,512,011 A * 4/1985 Turner .................. H04L 49/254
370/409
5,822,571 A  10/1998 Goodrum et al.
(Continued)

FOREIGN PATENT DOCUMENTS

EP   0811928 A2   12/1997
EP   3109766 A2   12/2016

OTHER PUBLICATIONS

International Search Report dated Nov. 22, 2019 in corresponding application PCT/IB2019/055707.
(Continued)

*Primary Examiner* — Faisal Choudhury
(74) *Attorney, Agent, or Firm* — Muncy, Geissler, Olds & Lowe, P.C.

(57) ABSTRACT

A circuit with a first buffer, a second buffer, a third buffer, a fourth buffer, a first data input for first data, a second data input for second data, a data output, and control logic is disclosed. The control logic connects the first data input to one of the buffers, connects the second data input to one of the buffers, and connects the data output to one of the buffers, swap the buffer currently connected to the first data input for a non-connected buffer when first data have been validly written through the first data input into the buffer currently connected to the first data input, swap the buffer currently connected to the second data input for the non-connected buffer when second data have been validly written through the second data input into the buffer currently connected to the second data input.

16 Claims, 6 Drawing Sheets

(51) Int. Cl.
    *H04L 49/901*     (2022.01)
    *H04L 49/9047*    (2022.01)
(58) Field of Classification Search
    USPC .......................................................... 370/413
    See application file for complete search history.

(56) References Cited

U.S. PATENT DOCUMENTS

| | | | | |
|---|---|---|---|---|
| 6,343,077 | B1* | 1/2002 | Chin | ................... H04L 12/5601 |
| | | | | 370/413 |
| 6,693,903 | B1* | 2/2004 | Shively | .................. H04Q 11/06 |
| | | | | 370/411 |
| 6,721,273 | B1* | 4/2004 | Lyon | ................... H04L 49/3081 |
| | | | | 370/413 |
| 8,156,353 | B2* | 4/2012 | Tsai | ...................... G06F 1/3209 |
| | | | | 370/231 |
| 9,870,339 | B2 | 1/2018 | Kang et al. | |
| 10,372,668 | B2 | 8/2019 | Kang et al. | |
| 2017/0293587 | A1* | 10/2017 | Yan | ..................... G06F 13/4045 |

OTHER PUBLICATIONS

Saad Mneimneh et al: "Switching Using Parallel Input-Output Queued Switches With No Speedup", IEEE / ACM Transactions on Networking, IEEE / ACM, New York, NY, US, vol. 10, No. 5, Oct. 31, 2002, pp. 653-665, DOI: 10.1109/TNET.2002.803919, ISSN: 1063-6692, XP058093922.

* cited by examiner

Prioritization of producer
swaps by query order

```
case fsm-state is
    when ,empty':
        if (swap-producer0='1' and swap-consumer='1') then
            next state = ,empty'
            Change P0/C
        elsif (swap-producer1='1' and swap-consumer='1') then
            next state = ,empty'
            Change P1/C
        elsif (swap-producer0='1') then
            next state = ,filled'
            Change P0/S
        elsif (swap-producer1='1') then
            next state = ,filled'
            Change P1/S
        end if when ,filled'
        if (swap-producer0='1' and swap-consumer='1') then
            next state = ,empty'
            Change P0/C
        elsif (swap-producer1='1' and swap-consumer='1') then
            next state = ,empty'
            Change P1/C
        elsif (swap-producer0='1') then
            next state = ,filled'
            Change P0/S
        elsif (swap-producer1='1') then
            next state = ,filled'
            Change P1/S
        elsif (swap-consumer='1') then
            next state = ,empty'
            Change C/S
        end if
```

Fig. 4b

CIRCUIT FOR A BUFFERED TRANSMISSION OF DATA

This nonprovisional application is a continuation of International Application No. PCT/162019/055707, which was filed on Jul. 4, 2019 and which claims priority to German Patent Application No. DE 10 2018 005 620.2, which was filed in Germany on Jul. 17, 2018 and which are both herein incorporated by reference.

BACKGROUND OF THE INVENTION

Field of the Invention

The present invention relates to a circuit for the buffered transmission of data from multiple transmitters to one receiver. In particular, the present invention relates to a circuit with four data buffers (hereinafter referred to as buffers) and with control logic that controls write and read accesses of the transmitters/the receiver to the buffers.

Description of the Background Art

Circuits for buffered transmission of data that have three buffers per channel are known from the prior art. The circuits provide one buffer for writing data and one buffer for reading out data, while an additional buffer makes it possible to swap the buffer into which data were written for the buffer from which data are being read. Consequently, a total of six buffers are required in the case of two channels.

SUMMARY OF THE INVENTION

The present invention improves on the prior art inasmuch as circuits according to the invention allow a transmission of data from two transmitters to one receiver with four buffers without restricting write access of the transmitters to the circuit.

A circuit according to an exemplary embodiment of the invention includes a first buffer, a second buffer, a third buffer, a fourth buffer, a first data input for first data, a second data input for second data, a data output, and control logic. The control logic is equipped to connect the first data input to one of the buffers, to connect the second data input to one of the buffers, and to connect the data output to one of the buffers.

The control logic is furthermore equipped to swap the buffer currently connected to the first data input for a non-connected buffer when first data have been validly written through the first data input into the buffer currently connected to the first data input, to swap the buffer currently connected to the second data input for the non-connected buffer when second data have been validly written through the second data input into the buffer currently connected to the second data input, and, for readout of data, to swap the buffer currently connected to the data output for the non-connected buffer when the non-connected buffer has newer validly written data.

Here, the term "data input" as used in the description and the claims should be understood to mean, in particular, a communication connection through which data can be transmitted to the circuit. Furthermore, the term "data output" can be understood to mean, for example, a communication connection through which data can be output by the circuit. The communication connections can be, e.g., electrically conductive connections by means of which current and/or voltage levels (e.g., logic levels) representing data can be transmitted to the circuit or output by the circuit.

In addition, the term "buffer" can be understood to mean, for example, a memory element (component) or an addressable region in a memory element (component). This means that a distinction between buffers can relate both to a logical distinction, e.g. with regard to addressable regions in a memory element, and to a distinction with regard to the memory elements (components) involved. Furthermore, the term "control logic" can be understood to mean, for example, a circuit that is equipped to control the circuit, and in particular to choose the buffer from which a data packet is to be provided and the buffer into which a data packet is to be written, starting from an analysis of the state of the circuit or of the read and/or write requests ("read/write requests") made to the circuit.

In addition, the terms "valid" and "invalid" can relate to, for example, to the correctness of data. An invalid data packet is, for example, a data packet in which a write error has occurred during writing into a buffer (and that consequently deviates in an erroneous way from an appropriate data packet in form and/or in content), or a data packet that was written correctly into the buffer but contains incorrect information (on account of a previous error).

A circuit according to the invention thus allows a continuous flow of data from the transmitters (or the data source or sources) to the receiver (or the data consumer or consumers) in that data packets are written into the buffers connected to the data inputs and are provided from the buffers at readout. Moreover, a circuit according to the invention allows a receiving of data that are transmitted over redundant data channels. Redundant data channels in this context are, for example, data channels over which the same user data are transmitted, wherein the user data are, e.g., transmitted along different (physical) transmission paths or transmitted along the same (physical) transmission path with a delay.

The circuit can be used, e.g., as a 4-buffer FIFO in automation engineering, where it can be implemented in a transceiver. The transceiver can be used, for example, for forwarding process data from a local bus to a field bus (e.g., in a bus coupler or a bus controller). For example, the local bus can have a logical ring topology in which data are (redundantly) exchanged in both ring directions between the bus nodes.

The process data can be written into the buffer in the form of data packets/data blocks (fixed length). In this case, the control logic can monitor that the data do not exceed a previously configured data block length. Once the data have been written into a buffer, the data from the applicable transmitter can be labeled as "valid" or as "invalid." In the event of an error, the receiver can then be supplied with data from the other buffer.

Preferably, for the purpose of readout of data, instead of swapping the buffer currently connected to the data output for the non-connected buffer, the control logic is equipped to connect the buffer that is currently connected to the first data input to the data output when a readout request is signaled and it is simultaneously signaled that a writing of first data into the buffer connected to the first data input has been completed, and to connect the buffer that is currently connected to the second data input to the data output when a readout request is signaled and it is simultaneously signaled that a writing of second data into the buffer connected to the second data input has been completed.

Here, the phrase "simultaneously signaled" can be understood to mean, for example, that a time offset between two signals is sufficiently small that the control logic receives the later signal before the circuit has generated a control command based on the earlier signal, or that the time gap is within an interval during which the control logic waits before the control command is generated.

The first data input or the second data input can be prioritized, and the control logic can furthermore be equipped to connect the buffer that is currently connected to the prioritized data input to the data output for the purpose of readout of data when a readout request is signaled and it is simultaneously signaled that a writing of data into the buffer connected to the first data input and a writing of data into the buffer connected to the second data input have been completed.

Consequently, when data are being received over both data inputs simultaneously, the data received over the prioritized data input are forwarded first or are the only data forwarded.

The connection of a buffer to the first data input, to the second data input, or to the data output can comprise a change of an address offset.

The connection of a buffer to the first data input, to the second data input, or to the data output can also comprise a switching between signal paths.

The circuit can be integrated into a bus node, in particular a bus transceiver.

The control logic can be equipped to set a flag when data have been validly written into a buffer and the buffer has been swapped, and to reset the flag cyclically, wherein a swapping of the buffers currently connected to the first and second data inputs for another buffer is suppressed when the flag is set.

The circuit can be arranged in a system having a first transmitter, a second transmitter, and a receiver, wherein the first transmitter is connected to the first data input, the second transmitter is connected to the second data input, and the receiver is connected to the data output, and the transmitters are equipped to transmit data packets through the data inputs to the circuit and to signal an end of a write operation to the circuit.

Here, the term "data packet" can be understood to mean, for example, binary coded information items that are transmitted/received in a block, wherein the information items typically share a context. Moreover, a data packet often has a defined structure that makes it possible to assign a binary coded information item to a corresponding section of the data packet.

The receiver can be equipped to signal a readout request to the circuit and to read out a data packet through the data output of the circuit.

The circuit can have s+2 buffers, wherein s indicates the number of transmitters.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4b shows pseudocode for the state diagram shown in FIG. 4a; and

DETAILED DESCRIPTION

Figure 1:
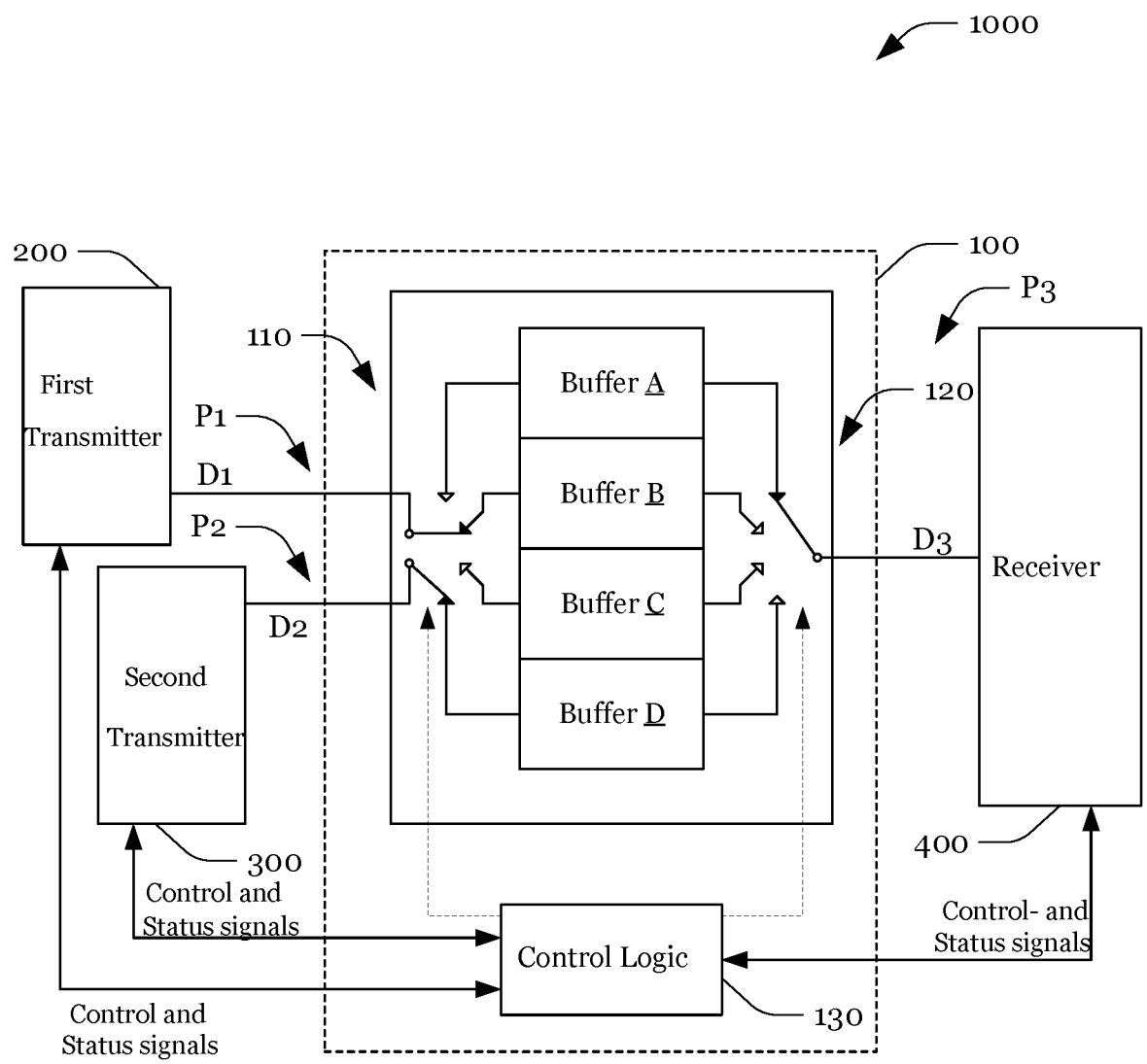
FIG. 1 shows a circuit according to the invention in accordance with an exemplary embodiment.

An. FIG. 1 shows an exemplary circuit 100 with a first buffer A, a second buffer B, a third buffer C, and a fourth buffer D. The buffers A-D can be implemented as multiple addressable regions in a memory element (e.g., "DPRAM pages") or as multiple separate memory elements (e.g., multiple DPRAMs). The circuit 100 includes a first data input P1 for first data D1, a second data input P2 for second data D2, and a data output P3 for outputting data D3. A first transmitter 200 is connected to the first data input P1, a second transmitter 300 is connected to the second data input P2, and a receiver 400 is connected to the data output P3.

The circuit 100 additionally includes control logic 130. The control logic 130 is equipped to connect the first data input P1 to one of the buffers A-D, to connect the second data input P2 to one of the buffers A-D, and to connect the data output P3 to one of the buffers A-D. In particular, a first switch 110 can be provided between the data inputs P1, P2 and the buffers A-D, as shown in FIG. 1, which switch makes it possible to establish a first data connection between the first transmitter 200 and one of the buffers A-D and simultaneously to establish a second data connection between the second transmitter 300 and one of the buffers A-D. Owing to the switchable connections, the transmitters 200, 300 can write data to each of the buffers A-D in alternation. As indicated in FIG. 1, the first switch 110 (or the switch setting) can be controlled by the control logic 130 through a control line.

Furthermore, a second switch 120 can be provided between the data output P3 and the buffers A-D, as shown in FIG. 1, which switch makes it possible to establish a third data connection between the receiver 400 and one of the buffers A-D. Owing to the switchable connection, data can be provided to the receiver 400 from each of the buffers A-D. Like the first switch 110, the second switch 120 can also be controlled by the control logic 130 by means of a control line, for example in that the control logic 130 transmits to the switches 110, 120 through the control line a control signal that signals to the switches 110, 120 which of the buffers A-D is to be connected to the transmitters 200, 300 and to the receiver 400, and which of the buffers A-D is not to be connected.

It is a matter of course here that the switches 110, 120 shown in FIG. 1 serve primarily to illustrate the switching between different connections. The invention is not restricted to the use of specific switches 110, 120, however. Instead, the switches 110, 120 shown in FIG. 1 can be implemented in the form of any desired devices that allow switching between the buffers, which is to say a disconnection of an existing connection and the establishment of a new connection.

Figure 2:
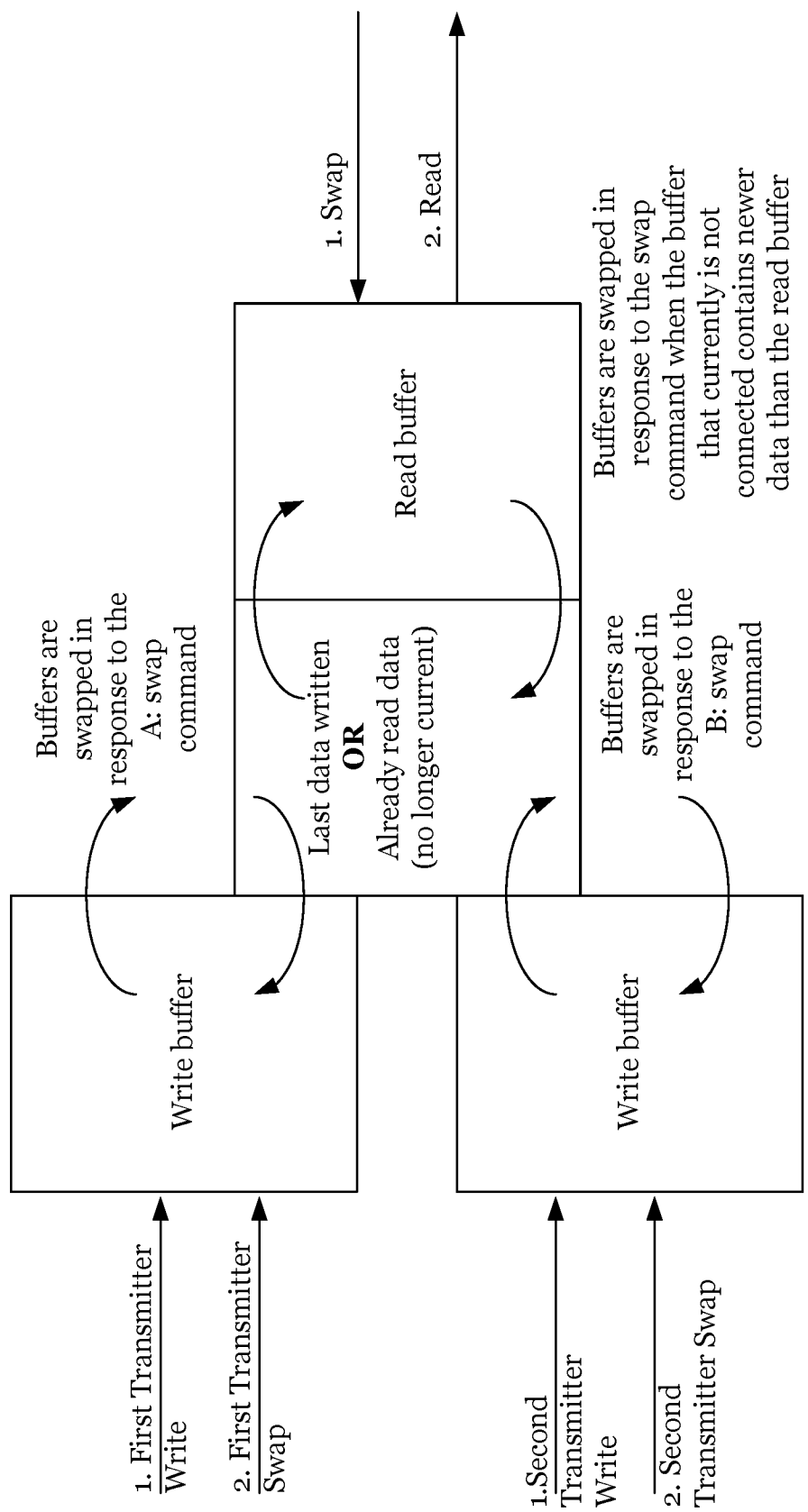
FIG. 2 illustrates sequences in the circuit from FIG. 1 during write and read accesses.

As illustrated in FIG. 2, the first transmitter 200 and the second transmitter 300 can write into the buffers A-D connected to them, and data can be provided to the receiver 400 from the buffer A-D connected to it. After the writing of data into a buffer A-D connected to a transmitter 200, 300, the relevant transmitter 200, 300 can trigger a buffer swap. For this purpose, the relevant transmitter 200, 300 can signal to the logic circuit 130 that a write operation was successfully completed and the data written into the buffer A-D are valid. The buffer swap can then be carried out between the written buffer A-D and the non-connected buffer A-D.

Consequently, when first data D1 have been validly written through the first data input P1 into the buffer A-D currently connected to the first data input P1, the buffer A-D currently connected to the first data input P1 can be swapped for the non-connected buffer A-D, and if second data D2 have been validly written through the second data input P2 into the buffer A-D currently connected to the second data input P2, the buffer A-D currently connected to the second data input P2 can be swapped for the non-connected buffer A-D. For readout of the data D3, the buffer A-D currently connected to the data output P3 can then be swapped for the non-connected buffer A-D (wherein this can be made dependent on whether the non-connected buffer A-D has newer validly written data than the buffer A-D currently connected to the data output P3).

When the control logic 130 is simultaneously signaled that first data D1 have been validly written through the first data input P1 into the buffer A-D currently connected to the first data input P1 and that second data D2 have been validly written through the second data input P2 into the buffer A-D currently connected to the second data input P2, the control logic 130 can furthermore be equipped to cause the buffer A-D currently connected to the first data input P1 or to the second data input P2 to be swapped directly for the currently non-connected buffer A-D, depending on whether the first data input P1 or the second data input P2 is prioritized by the circuit 100. The data input P1, P2 that is to be prioritized can be (unchangeably) defined or can be determined case by case by the control logic 130 on a control signal basis or on a random basis.

If the control logic 130 is simultaneously signaled that data D3 are to be provided to the receiver 400 and that first data D1 have been validly written through the first data input P1 into the buffer A-D currently connected to the first data input P1 or second data D2 have been validly written through the second data input P2 into the buffer A-D currently connected to the second data input P2, the control logic 130 can moreover be equipped to cause the buffer A-D currently connected to the first data input P1 or currently connected to the second data input P2 to be swapped directly for the buffer A-D currently connected to the data output P3.

Moreover, when the control logic 130 is simultaneously signaled that data D3 are to be provided to the receiver 400 and that first data D1 have been validly written through the first data input P1 into the buffer A-D currently connected to the first data input P1 and second data D2 have been validly written through the second data input P2 into the buffer A-D currently connected to the second data input P2, the control logic 130 can be equipped to cause the buffer A-D currently connected to the first data input P1 or to the second data input P2 to be swapped directly for the buffer A-D currently connected to the data output P3, depending on whether the first data input P1 or the second data input P2 is prioritized by the circuit 100.

Figure 3:
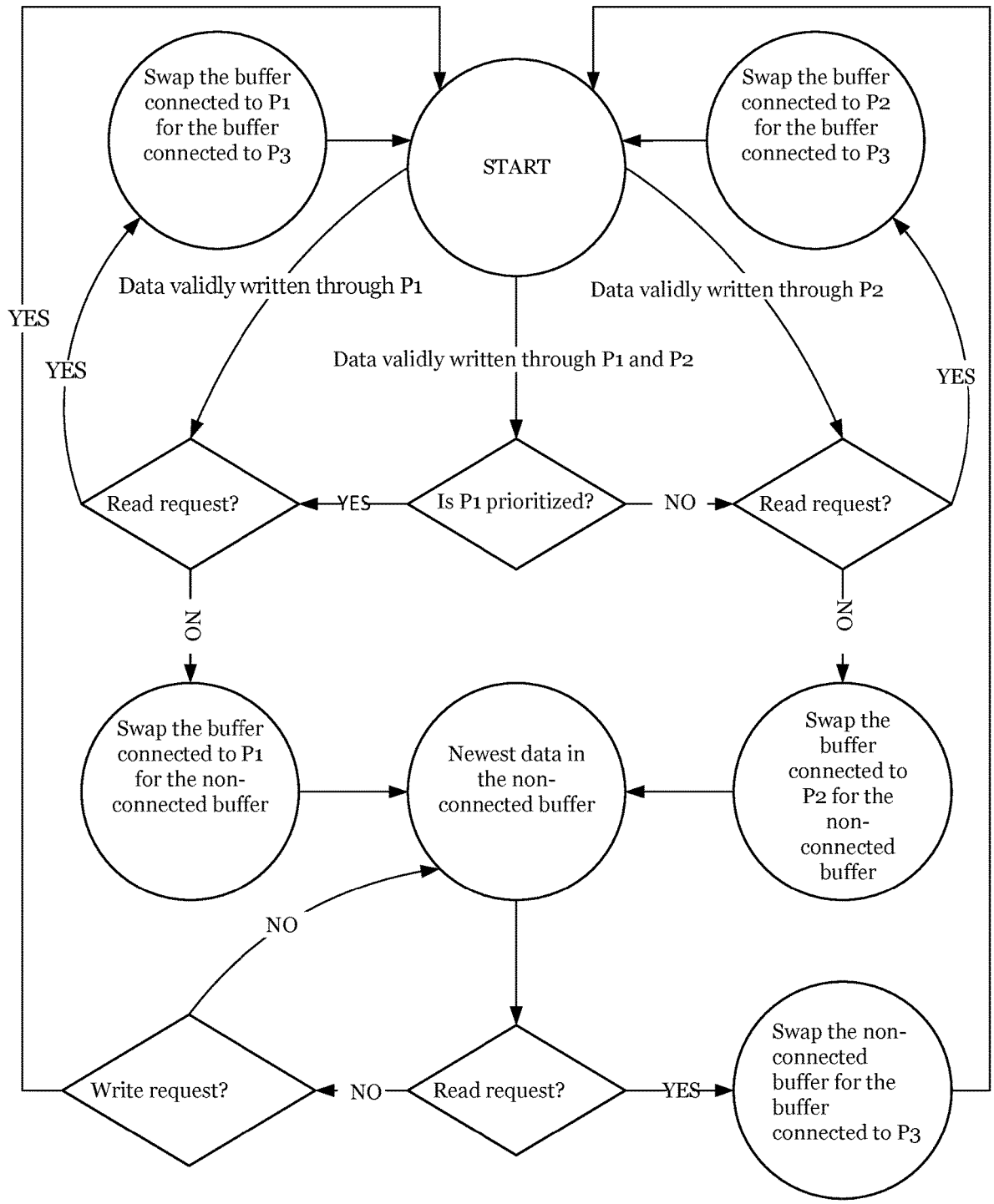
FIG. 3 shows a flowchart for the operation of the circuit shown in FIG. 1.

Depending on the use of the circuit 100, the control logic 130 can apply one, more, or all of the preceding rules, which are illustrated by way of example in FIG. 3 using a flow-chart. In this case, the transmitters 200, 300 can write data into the circuit 100 at any time, and the receiver 400 can read data out of the circuit 100 at any time.

Figure 4A:
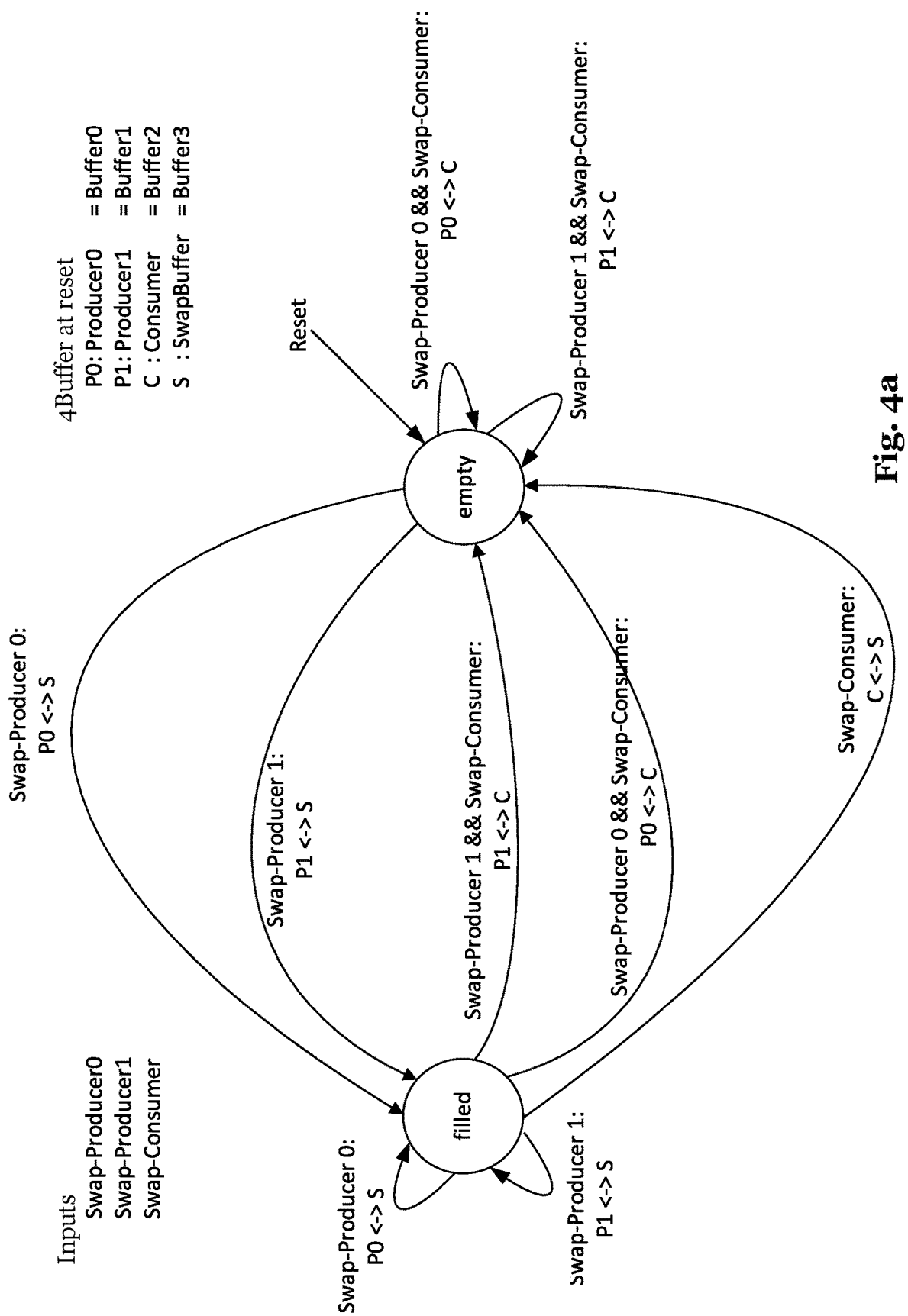
FIG. 4a shows a state diagram of the circuit shown in FIG. 1.

As shown in FIGS. 4a and 4b, the circuit 100 has two states: "empty" and "filled". After a restart or a reset, the circuit 100 is in the "empty" state. In this state, if a transmitter 200, 300 and a receiver 400 simultaneously request a buffer swap, the buffers A-D connected to the relevant transmitter 200, 300 and to the receiver 400 are swapped directly, and the circuit 100 remains in the "empty" state. However, if only a transmitter 200, 300 requests a buffer swap in this state, then the buffer A-D connected to the relevant transmitter 200, 300 is swapped for the free buffer ("swap buffer"), and the circuit 100 switches into the "filled" state.

In this state, if only a transmitter 200, 300 (but not simultaneously the receiver 400) yet again requests a buffer swap, the buffer A-D connected to the relevant transmitter 200, 300 is swapped for the free buffer A-D ("swap buffer"), and the circuit 100 remains in the "filled" state. However, if the receiver 400 requests a buffer swap, the buffer A-D connected to the receiver 400 is swapped for the free buffer A-D ("swap buffer") or, in the case of a simultaneous request for a buffer swap by the receiver 400 and a transmitter 200, 300, is directly swapped for the buffer A-D connected to the relevant transmitter 200, 300, and the circuit 100 transitions into the "empty" state.

In addition to the rules illustrated in FIG. 3, FIG. 4a, and FIG. 4b, the control logic 130 can also be equipped to follow (any desired) further rules. For instance, the control logic 130 can be equipped to divide the operation of the circuit 100 into cycles, and, after the writing and swapping of a buffer A-D connected to a data input P1, P2, to suppress a swapping of a buffer A-D that is written subsequently within the same cycle. For example, the control logic 130 can be equipped to set a flag (which is to say an indicator value) after the writing and swapping of a buffer A-D connected to a data input P1, P2, and to suppress the swapping of the buffer A-D that is connected to a data input P1, P2 while the flag is set, with the flag being reset at the end of each cycle. The end of a cycle can be defined here by the expiration of a time interval or by the receiving of a cycle signal. This can achieve the result that a faster of two redundant data channels is prioritized.

Figure 5:
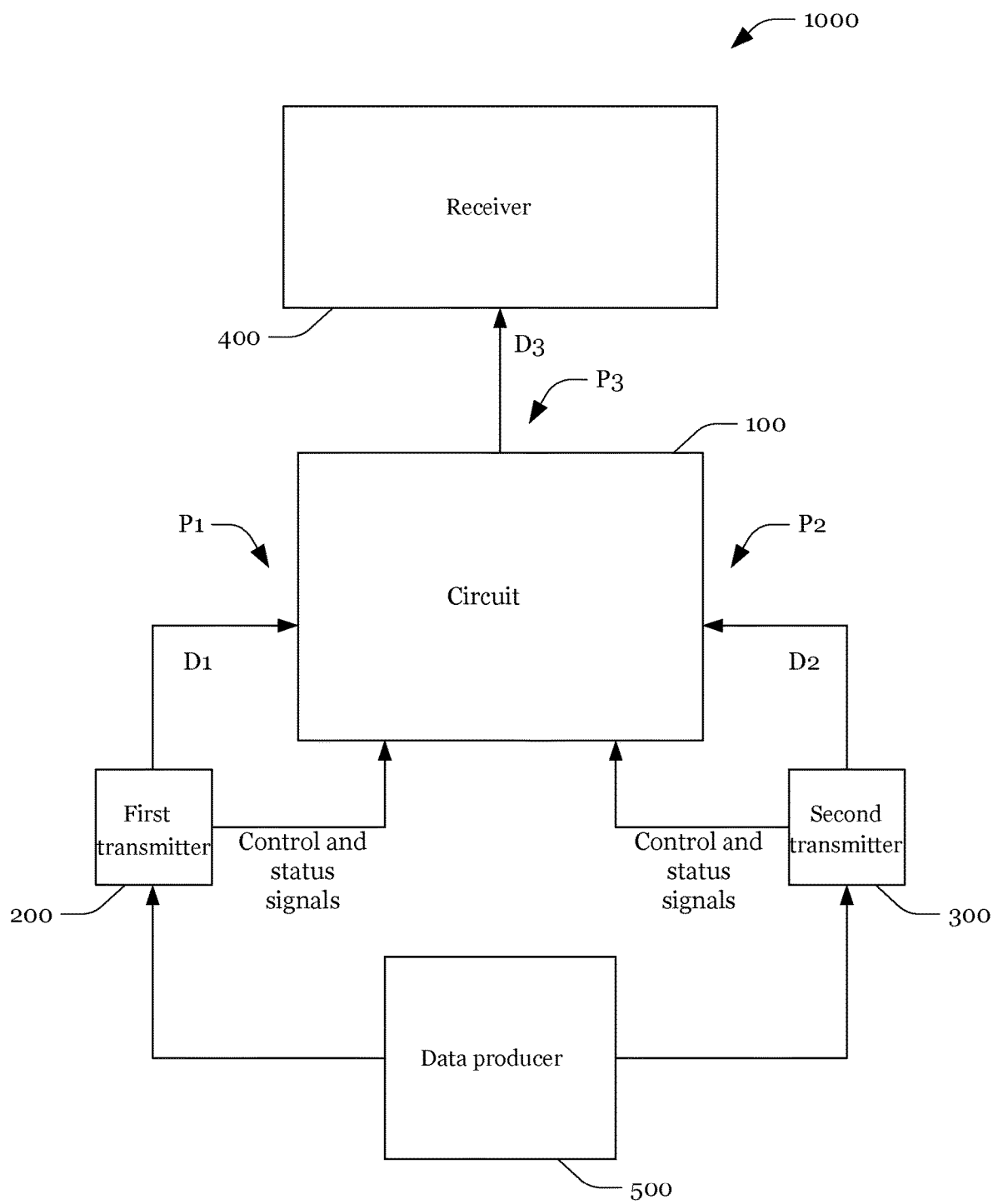
FIG. 5 illustrates a possible use of the circuit shown in FIG. 1 for the redundant transmission of data.

For instance, the first transmitter 200 and the second transmitter 300 can transmit redundant data D1, D2 so that the first data D1 and the second data D2 match one another in error-free operation and are received at (essentially) the same time. For example, the first transmitter 200 and the second transmitter 300 can, as shown in FIG. 5, be arranged together with a data producer 500 and the circuit 100 in a ring topology, wherein the transmission of the data D1, D2 takes place redundantly (in both ring directions). For instance, the data producer 500 can be equipped to transmit data packets through the transmitters 200, 300 (which can be implemented as, e.g., transceivers) and the circuit 100 to the receiver 400 at regular intervals in error-free operation, wherein the receiver 400 requests data packets from the circuit 100 at regular intervals, or reads out data packets from the circuit 100 at regular intervals.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit comprising:
   buffers including:
      a first buffer;
      a second buffer;
      a third buffer; and
      a fourth buffer;
   data inputs including:
      a first data input for first data; and
      a second data input for second data;
   a data output; and
   control logic adapted to selectively connect the first data input to each of the buffers, adapted to selectively connect the second data input to each of the buffers, adapted to selectively connect the data output to each of the buffers, adapted to swap the buffer currently connected to the first data input for a non-connected buffer when first data have been validly written through the first data input into the buffer currently connected to the first data input, adapted to swap the buffer currently connected to the second data input for the non-connected buffer when second data have been validly written through the second data input into the buffer currently connected to the second data input, and, adapted, for readout of data, to swap the buffer currently connected to the data output for the non-connected buffer when the non-connected buffer has newer validly written data.

2. The circuit according to claim 1, wherein, for the purpose of readout of data, instead of swapping the buffer currently connected to the data output for the non-connected buffer, the control logic is furthermore equipped to connect the buffer that is currently connected to the first data input to the data output when a readout request is signaled and it is simultaneously signaled that a writing of first data into the buffer connected to the first data input has been completed, and to connect the buffer that is currently connected to the second data input to the data output when a readout request is signaled and it is simultaneously signaled that a writing of second data into the buffer connected to the second data input has been completed.

3. The circuit according to claim 1, wherein the first data input or the second data input is prioritized, and the control logic is furthermore equipped to connect the buffer that is currently connected to the prioritized data input to the data output for the purpose of readout of data when a readout request is signaled and it is simultaneously signaled that a writing of first data into the buffer connected to the first data input and a writing of second data into the buffer connected to the second data input have been completed.

4. The circuit according to claim 1, wherein the connection of a buffer to the first data input, to the second data input, or to the data output comprises a change of an address offset.

5. The circuit according to claim 1, wherein the connection of a buffer to the first data input, to the second data input, or to the data output comprises a switching between signal paths.

6. The circuit according to claim 1, wherein the circuit is integrated into a bus node or a bus transceiver.

7. The circuit according to claim 1, wherein the control logic is equipped to set a flag when data have been validly written into a buffer and the buffer was swapped, and to reset the flag cyclically, wherein a swapping of the buffers currently connected to the first and second data inputs for another buffer is suppressed when the flag is set.

8. The circuit according to claim 1, wherein the first buffer, the second buffer, the third buffer and the fourth buffer are implemented as multiple addressable regions in a memory element.

9. The circuit according to claim 1, wherein the first buffer, the second buffer, the third buffer and the fourth buffer are implemented as separate memory elements.

10. The circuit according to claim 1, further comprising a switch disposed between the data inputs and the buffers.

11. The circuit according to claim 1, wherein the first data input and the second data input are configured to write data to the first buffer, the second buffer, the third buffer and the fourth buffer in alternation.

12. The circuit system according to claim 1, further comprising a switch disposed between the data output and the buffers.

13. The circuit according to claim 1, further comprising:
   a first switch disposed between the data inputs and the buffers; and
   a second switch disposed between the data output and the buffers.

14. A system comprising:
   a first transmitter;
   a second transmitter;
   a receiver; and
   the circuit according to claim 1,
   wherein the first transmitter is connected to the first data input,
   wherein the second transmitter is connected to the second data input,
   wherein the receiver is connected to the data output, and
   wherein the first and second transmitters are equipped to transmit data packets through the data inputs to the circuit and to signal an end of a write operation to the circuit.

15. The system according to claim 14, wherein the receiver is equipped to signal a readout request to the circuit and to read out a data packet through the data output of the circuit.

16. The system according to claim 14, wherein the circuit has s+2 buffers, and wherein s indicates the number of transmitters.

* * * * *